United States Patent
Takada et al.

(10) Patent No.: US 7,814,562 B2
(45) Date of Patent: Oct. 12, 2010

(54) INFORMATION PROCESSING APPARATUS, CONTROL METHOD THEREOF, CONTROL PROGRAM, AND STORAGE MEDIUM

(75) Inventors: Tomoyuki Takada, Ohta-ku (JP); Noriyuki Suzuki, Shibuya-ku (JP); Hiroyasu Ito, Setagaya-ku (JP); Takeshi Toyama, Hiratsuka (JP)

(73) Assignee: Canon Kabushiki Kaisha (JP)

( * ) Notice: Subject to any disclaimer, the term of this patent is extended or adjusted under 35 U.S.C. 154(b) by 1035 days.

(21) Appl. No.: 11/087,488

(22) Filed: Mar. 23, 2005

(65) Prior Publication Data

US 2005/0216761 A1 Sep. 29, 2005

(30) Foreign Application Priority Data

Mar. 24, 2004 (JP) .............................. 2004-088100

(51) Int. Cl.
*G06F 7/04* (2006.01)
(52) U.S. Cl. .......................................... 726/31; 726/27
(58) Field of Classification Search .................. 726/27, 726/31; 713/165, 166, 169; 380/201
See application file for complete search history.

(56) References Cited

U.S. PATENT DOCUMENTS

| | | | |
|---|---|---|---|
| 6,035,412 A * | 3/2000 | Tamer et al. ...................... 714/6 |
| 6,421,779 B1 * | 7/2002 | Kuroda et al. ................. 713/169 |
| 6,738,877 B1 * | 5/2004 | Yamakawa et al. ........... 711/164 |
| 6,944,734 B2 * | 9/2005 | Anzai et al. ................... 711/163 |
| 7,246,247 B2 * | 7/2007 | Matsuzaki et al. ........... 713/193 |
| 7,512,320 B2 | 3/2009 | Yokota et al. |
| 7,519,985 B2 | 4/2009 | Kawamura et al. |
| 2003/0142960 A1 | 7/2003 | Yokota et al. |
| 2004/0042413 A1 | 3/2004 | Kawamura et al. |
| 2004/0187022 A1 * | 9/2004 | Asada et al. ................. 713/200 |
| 2009/0252477 A1 | 10/2009 | Yokota et al. |

FOREIGN PATENT DOCUMENTS

| | | |
|---|---|---|
| CN | 1421786 A | 6/2003 |
| EP | 1 414 191 A1 | 4/2004 |
| JP | 03-091047 A | 4/1991 |
| JP | 11-261950 A | 9/1999 |
| JP | 11-296436 A | 10/1999 |

(Continued)

OTHER PUBLICATIONS

Partial English Translation of the Office Action issued in the counterpart Chinese Application 2005100560697.

(Continued)

*Primary Examiner*—Emmanuel L Moise
*Assistant Examiner*—Ali S Abyaneh
(74) *Attorney, Agent, or Firm*—Rossi, Kimms & McDowell LLP

(57) ABSTRACT

In an information processing apparatus which is equipped with plural storage devices, there are provided a security information comparison unit for, in a case where data is moved from a movement source storage device to a movement destination storage device, comparing security information of the movement source storage device with security information of the movement destination storage device, and a data movement control unit for controlling the movement of the data based on a comparison result by the security information comparison unit. Thus, it is possible to strongly secure safety with respect to the movement and/or copy of the data among the storage devices by a user.

14 Claims, 9 Drawing Sheets

FOREIGN PATENT DOCUMENTS

| | | |
|---|---|---|
| JP | 11-313089 A | 11/1999 |
| JP | 2001-326662 A | 11/2001 |
| JP | 2002-175090 A | 6/2002 |
| JP | 2003-186724 A | 7/2003 |
| WO | 03/013068 A1 | 2/2003 |

OTHER PUBLICATIONS

Full English Translation of Japanese Office Action (Notification of Reason For Refusal) dated Jan. 19, 2010 issued in corresponding Japanese application 2004-088100.

* cited by examiner

FIG. 9A

WARNING!

DATA MOVEMENT/COPY DESTINATION STORAGE DEVICE DOES NOT HAVE SECURITY FUNCTION.
THERE IS A FEAR THAT SECURITY LEVEL TO DATA DETERIORATES DUE TO DATA MOVEMENT/COPY.
DATA MOVEMENT/COPY EXECUTION?

[ YES ]   [ NO ]

FIG. 9B

WARNING!

SECURITY FUNCTION OF DATA MOVEMENT/COPY DESTINATION STORAGE DEVICE IS NOT SET TO BE VALID.
THERE IS A FEAR THAT SECURITY LEVEL TO DATA DETERIORATES DUE TO DATA MOVEMENT/COPY.
DATA MOVEMENT/COPY EXECUTION?

[ YES ]   [ NO ]

FIG. 9C

WARNING!

USER NAME OF DATA MOVEMENT/COPY SOURCE STORAGE DEVICE DOES NOT CONFORM TO
USER NAME OF MOVEMENT/COPY DESTINATION STORAGE DEVICE.
THERE IS A FEAR THAT SECURITY LEVEL TO DATA DETERIORATES DUE TO DATA MOVEMENT/COPY.
DATA MOVEMENT/COPY EXECUTION?

[ YES ]   [ NO ]

INFORMATION PROCESSING APPARATUS, CONTROL METHOD THEREOF, CONTROL PROGRAM, AND STORAGE MEDIUM

BACKGROUND OF THE INVENTION

1. Field of the Invention

The present invention relates to an information processing apparatus, a control method of the information-processing apparatus, a control program for executing the control method, and a storage medium of storing the control program. In particular, the present invention relates to an information processing apparatus which is equipped with plural storage devices, a control method of the information processing apparatus, a control program for executing the control method, and a storage medium of storing the control program.

2. Related Background Art

In recent years, the capacity of a storage device such as a hard disk or the like becomes large remarkably. For this reason, it is examined aiming at commercial manufacturing of a small-sized and large-capacity portable storage device such as the Microdrive, a memory according to the iVDR (Information Versatile Disk for Removable usage), or the like. Generally, many of such storage devices use a general purpose interface standard such as the ATA/ATAPI (Advanced Technology Attachment/Advanced Technology Attachment Packet Interface) standard, the SCSI (Small Computer System Interface) standard, the PCMCIA (Personal Computer Memory Card International Association) interface standard, the USB (Universal Serial Bus) interface standard, the IEEE (Institute of Electrical and Electronic Engineers) 1394, etc. Therefore, since the general purpose interface standard can be shared by many kinds of devices of supporting this standard, the many kinds of small-sized and large-capacity portable storage devices are in widespread use. On one hand, since the general purpose interface standard is used, a third person can easily access the data stored in the storage device, whereby there is a problem that the data stored in the storage device is leaked to the third person who is not intended by the user.

Consequently, for example, a hard disk which actually has an access limitation function based on a password defined by an ATA/ATAPI standard security mode feature set, and a personal computer which is equipped with the relevant hard disk are available.

Moreover, a storage device which actually has, in addition to the access limitation function, a function to register plural users and limit a writing or reading operation with respect to each of the registered users is proposed (e.g., Japanese Patent Application Laid-Open No. H11-296436).

However, although the storage device can prevent the third person not intended by the user from wrongly or unjustly accessing the data stored in the relevant storage device, an allowable or qualified user can of course access the stored data. Moreover, after the user is once allowed to access the stored data, the relevant user can freely move and copy the accessed data.

Therefore, for example, there is a possibility that the user carelessly moves and/or copies the data to which high concealment or secrecy is necessary (called high-concealment data) stored in the storage device of high security level, such as a storage device having a user authentication function, etc., to the storage device having no security function, as the user is unconscious of deterioration of the security level. In consequence, there is a risk that the high-concealment data is leaked to the third party not intended by the user.

If the large-capacity portable storage device is further in widespread use and frequently used to store the data and move the data among the plural devices, it becomes difficult for the user to adequately manage and control the storage device, whereby the risk of data leakage due to the careless data movement and/or copy further increases.

SUMMARY OF THE INVENTION

In consideration of the above related background art, an object of the present invention is to be able to strongly secure safety with respect to movement and/or copy of data among storage devices by a user.

To achieve the object, an information processing apparatus according to one preferred embodiment of the present invention is characterized by an information processing apparatus which is equipped with plural storage devices, and comprises:

a security information comparison unit adapted to, in a case where data is moved from a movement source storage device to a movement destination storage device, compare security information of the movement source storage device with security information of the movement destination storage device; and a data movement control unit adapted to control the movement of the data based on a comparison result by the security information comparison unit.

Moreover, to achieve the object, a control method for an information processing apparatus according to one preferred embodiment of the present invention is characterized by a control method for an information processing apparatus which is equipped with plural storage devices, and comprises:

a security information comparison step of, in a case where data is moved from a movement source storage device to a movement destination storage device, comparing security information of the movement source storage device with security information of the movement destination storage device; and a data movement control step of controlling the movement of the data based on a comparison result in the security information comparison step.

Other objects, features and advantages of the present invention will become apparent from the following detailed description taken in conjunction with the accompanying drawings.

BRIEF DESCRIPTION OF THE DRAWINGS

FIG. 9A is a diagram showing an example of a selection screen to be displayed in a step S801 of FIG. 8 in a case where the storage device to which data is moved and/or copied is not a storage device having a security function;

FIG. 9B is a diagram showing an example of the selection screen to be displayed in the step S801 of FIG. 8 in a case where the security function of the storage device to which data is moved and/or copied is not effectively set; and FIG. 9C is a diagram showing an example of the selection screen to be displayed in the step S801 of FIG. 8 in a case where the user name of the storage device from which data is moved and/or copied does not conform to the user name of the storage device to which the data is moved and/or copied.

DETAILED DESCRIPTION OF THE PREFERRED EMBODIMENTS

Hereinafter, the preferred embodiments of the present invention will be explained in detail with reference to the accompanying drawings.

Figure 1:
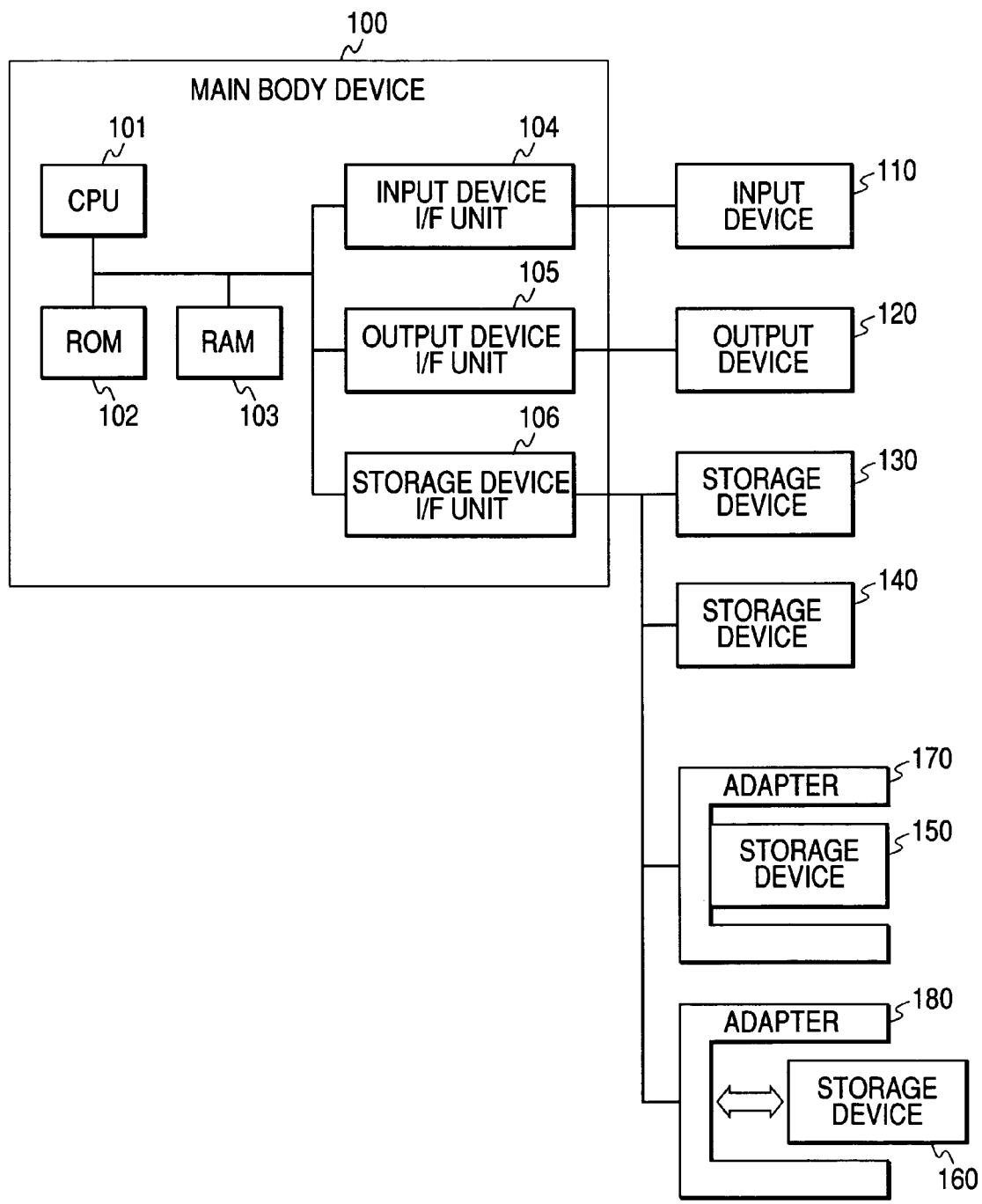
FIG. 1 is a block diagram schematically showing the internal constitution of an information processing apparatus according to the present invention.

FIG. 1 is a block diagram schematically showing the internal constitution of an information processing apparatus according to the embodiment of the present invention.

In FIG. 1, the information processing apparatus according to the embodiment of the present invention consists of a main body device 100, an input device 110, an output device 120, and plural storage devices 130, 140, 150 and 160 (often called storage devices 130 to 160 for the sake of convenience).

Moreover, the main body device 100 is equipped with a CPU 101, a ROM 102, a RAM 103, an input device I/F (interface) unit 104 for connecting a signal to the input device 110, an output device I/F unit 105 for connecting a signal to the output device 120, and a storage device I/F unit 106 for connecting signals respectively to the storage devices 130 to 160. Thus, the main body device 100 controls the input device 110, the output device 120 and the storage devices 130 to 160 respectively. Here, the main body device 100 is, for example, a personal computer, a server or the like.

The input device 110 is, for example, a keyboard, a mouse or the like which transfers the information input by a user to the main body device 100.

The output device 120 is, for example, a display, a speaker or the like which outputs the information transferred from the main body device 100, in response to an indication from the main body device 100.

Besides, each of the storage devices 130 to 160 has a storage medium such as a magnetic storage medium (a magnetic disk, a magnetic tape, or the like), an optical storage medium (a CD, a DVD, or the like), a magnetooptical storage medium (an MO disk, or the like), a semiconductor storage medium, or the like to store various data. Incidentally, the storage device may be a fixed storage device such as the storage device 130 or 140 which is directly connected to the main body device 100 by means of a connector or a cable, and may be a portable storage medium such as the storage device 150 or 160 which can be easily detached. Here, the storage devices 150 and 160 are also connected to the main body device 100 respectively through adapters 170 and 180.

It should be noted that the embodiment will be explained on the premise that each of the storage devices 130 to 160 is an HDD (hard disk drive).

Figure 2:
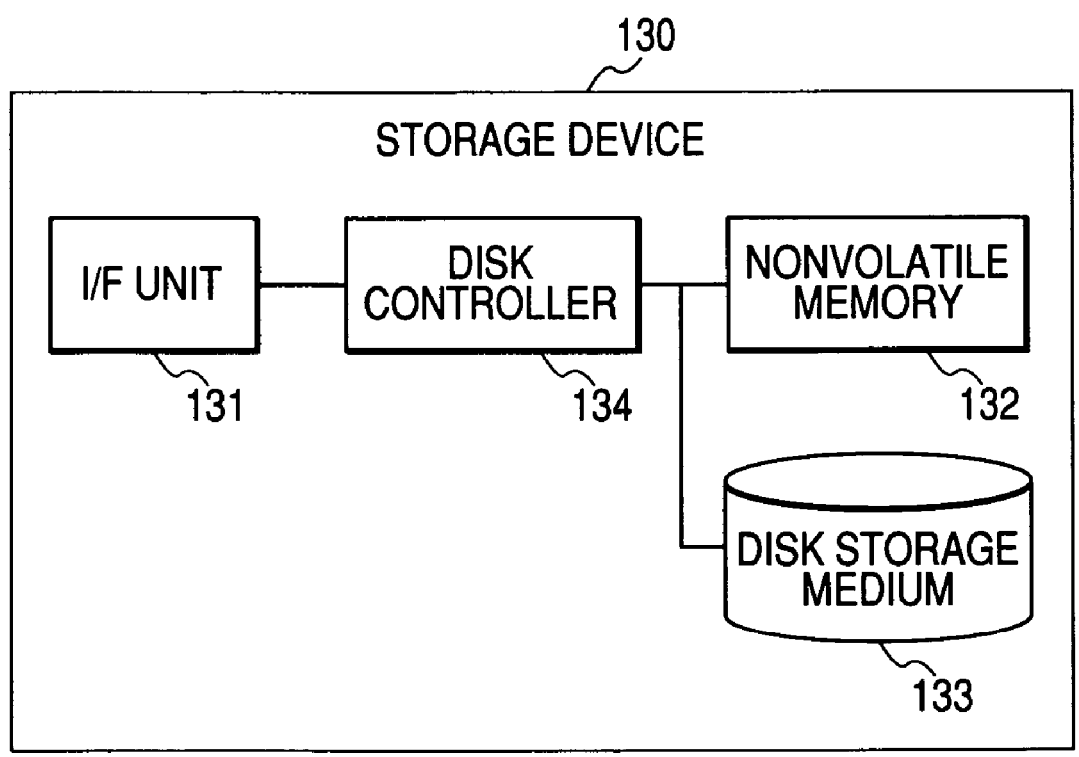
FIG. 2 is a block diagram schematically showing the internal constitution of a storage device 130 in FIG. 1.

FIG. 2 is a block diagram schematically showing the internal constitution of the storage device 130 illustrated in FIG. 1.

In FIG. 2, the storage device 130 is equipped with an I/F unit 131 for connecting a signal to the main body device 100, a nonvolatile memory 132, a disk storage medium 133, and a disk controller 134 for controlling the I/F unit 131, the nonvolatile memory 132 and the disk storage medium 133. Here, it should be noted that the nonvolatile memory 132 may be contained in the disk controller 134.

The constitution of each of the storage devices 140, 150 and 160 is basically the same as that of the storage device 130. Incidentally, the storage devices 130 to 160 mixedly include a storage device which has a security function (i.e., a user authentication function) with respect to the data stored therein, and a storage device which does not have the security function. Hereinafter, the storage device which has the security function is called the security-function storage device for the sake of convenience. In any case, it should be noted that the embodiment will be explained on the premise that the storage device 130 is the security-function storage device.

Figure 3:
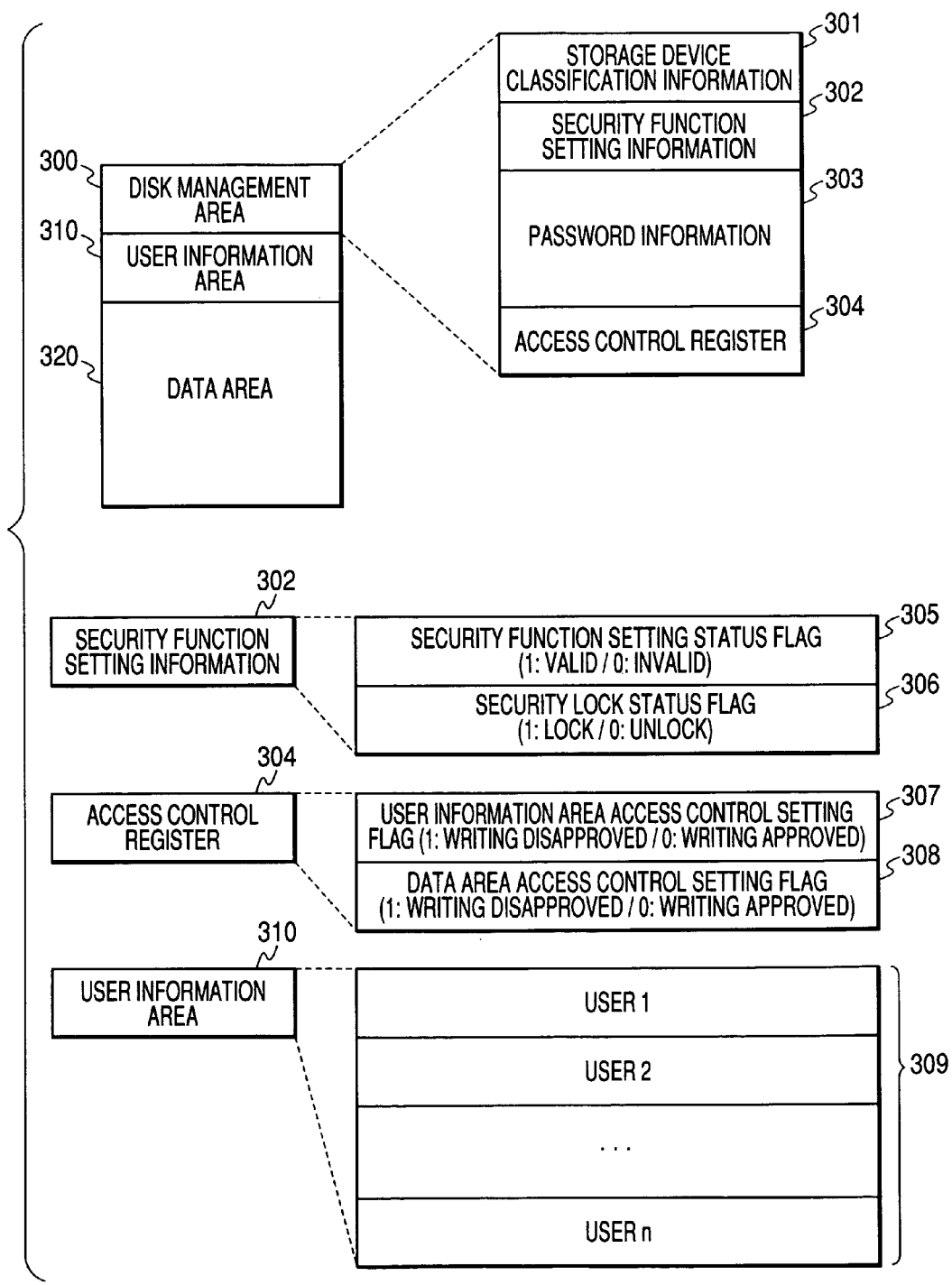
FIG. 3 is a diagram showing the configurations of the storage areas in the storage device 130 of FIG. 2.

FIG. 3 is a diagram showing the configurations of the storage areas included in the storage device 130 illustrated in FIG. 2.

In FIG. 3, the security-function storage device 130 has logically divided three areas on the nonvolatile memory 132 or the disk storage medium 133. More specifically, the security-function storage device 130 has a disk management area 300, a user information area 310 and a data area 320.

Here, storage device classification information 301, security function setting information 302 which indicates whether or not the security function is valid, password information 303 which is used to access the user information area 310 and the data area 320, and an access control register 304 are stored in the disk management area 300.

The storage device classification information 301 is the information which indicates that the storage device is the security-function storage device. The security function setting information 302 has a security function setting status flag 305 and a security lock status flag 306. The security function setting status flag 305 indicates whether or not the security function is valid, that is, on/off of the security function itself. More specifically, when the security function itself is on (that is, the security function is valid), the flag of "1" stands. Meanwhile, when the security function itself is off (that is, the security function is invalid), the flag of "0" stands. Besides, the security lock status flag 306 is the flag which indicates whether access to the user information area 310 and the data area 320 is in an access inhibition status (security lock status) or in an access inhibition release status (security unlock status).

The access control register 304 has a user information area access control setting flag 307 which indicates access control setting to the user information area 310 and a data area access control setting flag 308 which indicates access control setting to the data area 320. Thus, the storage device 130 controls the access from the main body device 100 to the user information area 310 and the data area 320, based on the values of the user information area access control setting flag 307 and the data area access control setting flag 308. Here, it should be noted that the access includes the status that data writing from the main body device 100 to the user information area 310 and the data area 320 is disapproved (or inhibited) (that is, only data reading is approved (or permitted)), and the status that the data writing from the main body device 100 to the user information area 310 and the data area 320 is approved.

Incidentally, the storage device classification information 301, the security function setting information 302 and the access control register 304 are stored so as to be readable by the main body device 100. However, the password information 303 is stored so as not to be readable by the main body device 100.

Besides, user discrimination information 309 which indicates the user names (i.e., USER 1, USER 2, ..., USER n) of the storage device 130 is stored in the user information area 310. Besides, the data area 320 is the area which can be used to store arbitrary data by a user.

Figure 4:
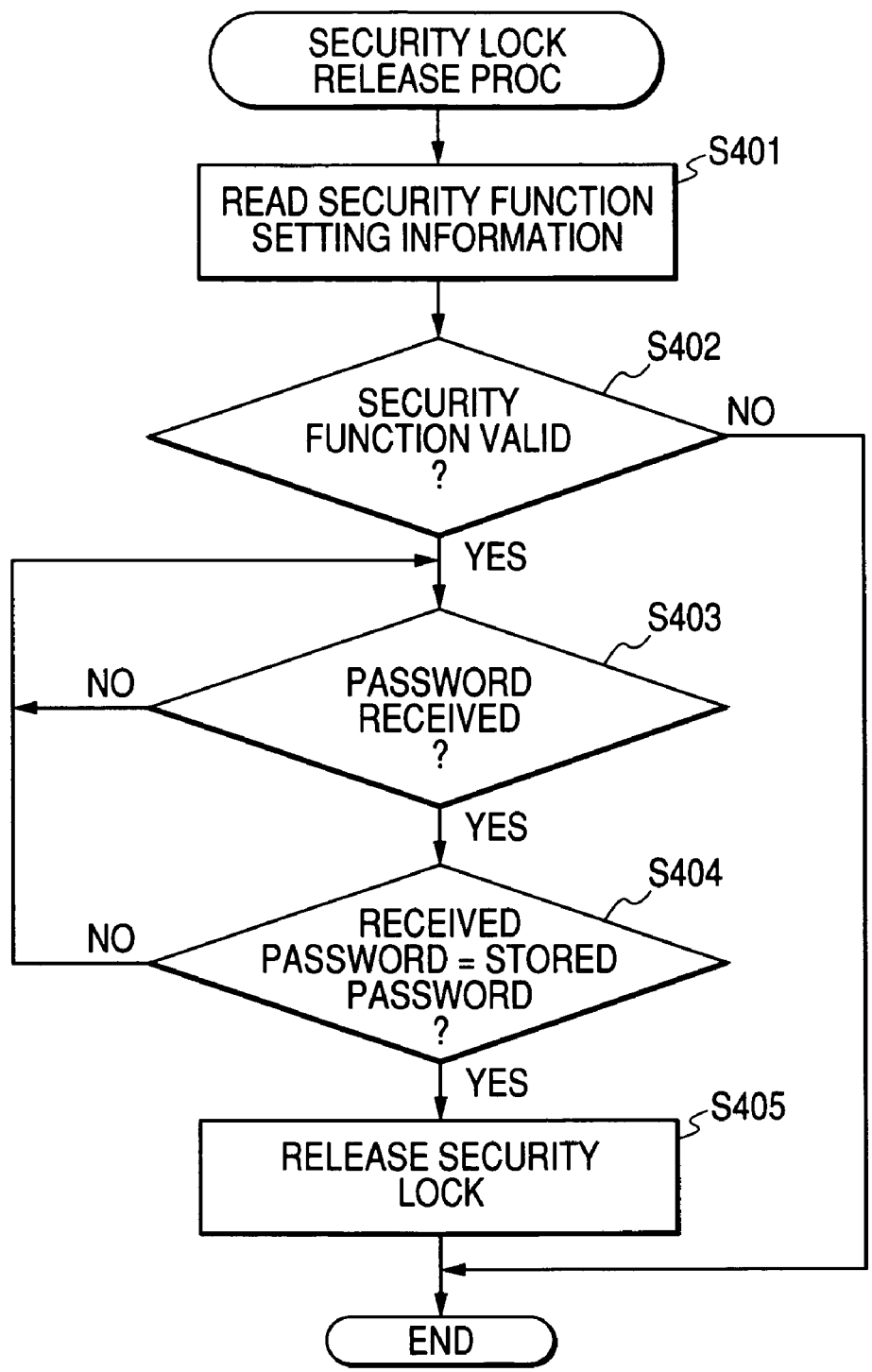
FIG. 4 is a flow chart of a security lock release process to be executed by the storage device 130 of FIG. 2.

FIG. 4 is a flow chart of a security lock release process to be executed by the storage device 130 shown in FIG. 2. Here, it should be noted that the security lock release process is executed when the power supply of the storage device 130 is turned on.

In FIG. 4, first of all, the security function setting information 302 is read from the disk management area 300 by the disk controller 134 of the security-function storage device 130 (step S401), and it is then judged whether or not the security function has been set to be valid (step S402). When judged that the security function has been set to be valid, the disk controller 134 stands ready to receive a password from the main body device 100 (step S403). At that time, a writing command from the main body device 100 to the disk management area 300 and all of access commands from the main body device 100 to the user information area 310 and the data area 320 are abandoned. Further, data writing to the disk management area 300 and all of accesses to the user information area 310 and the data area 320 are not at all permitted.

Then, when the password is received form the main body device 100 (YES in the step S403), it is judged whether or not the received password is equivalent to the password information 303 stored in the disk management area 300 (step S404). When judged that the received password is equivalent to the password information 303 stored in the disk management area 300, the security lock is released, and information indicating that the security lock has been released is written to the security function setting information 302 in the disk management area 300 (step S405). After that, the security lock release process ends.

Meanwhile, when judged in the step S404 that the received password is not equivalent to the password information 303 stored in the disk management area 300, the flow returns to the step S403 to stand ready to receive a password from the main body device 100.

In the meantime, when judged in the step S402 that the security function is not set to be valid, the security lock release process ends.

In the security lock release process, when judged in the step S402 that the security function is not set to be valid, or when the security lock is released in the step S405, the access command to the data area 320 is received by the storage device 130, and the access to the data area 320 is permitted. However, when the security function is set to be valid, the access control is executed according to the status of the data area access control setting flag 308. That is, when the value of the data area access control setting flag 308 indicates that the data writing is disapproved (that is, only the data reading is approved), a reading command is received, but the writing command is abandoned. Meanwhile, when the value of the data area access control setting flag 308 indicates that the data writing is approved, both the reading command and the writing command are received. Moreover, by receiving the writing command to the security function setting information 302 or the password information 303 in the disk management area 300 through the storage device 130, rewriting of the security function setting information 302 or the password information 303 may be permitted. However, when the security function is set to be valid, the access control to the user information area is executed according to the status of the user information area access control setting flag 307. That is, when the value of the user information area access control setting flag 307 indicates that the data writing is disapproved (that is, only the data reading is approved), the reading command is received, but the writing command is abandoned. Meanwhile, when the value of the user information area access control setting flag 307 indicates that the data writing is approved, both the reading command and the writing command are received.

Here, it should be noted that the security lock release process can be achieved by implementing in the storage device an ATA/ATAPI standard Security Mode Feature Set which is widely known as an interface standard for a storage such as a hard disk or the like.

According to the security lock release process shown in FIG. 4, when the received password is equivalent to the password information 303 stored in the disk management area 300 (YES in the step S404), the security lock is released (step S405), whereby it is possible to release the security lock only in a case where a correct password is input.

Figure 5:
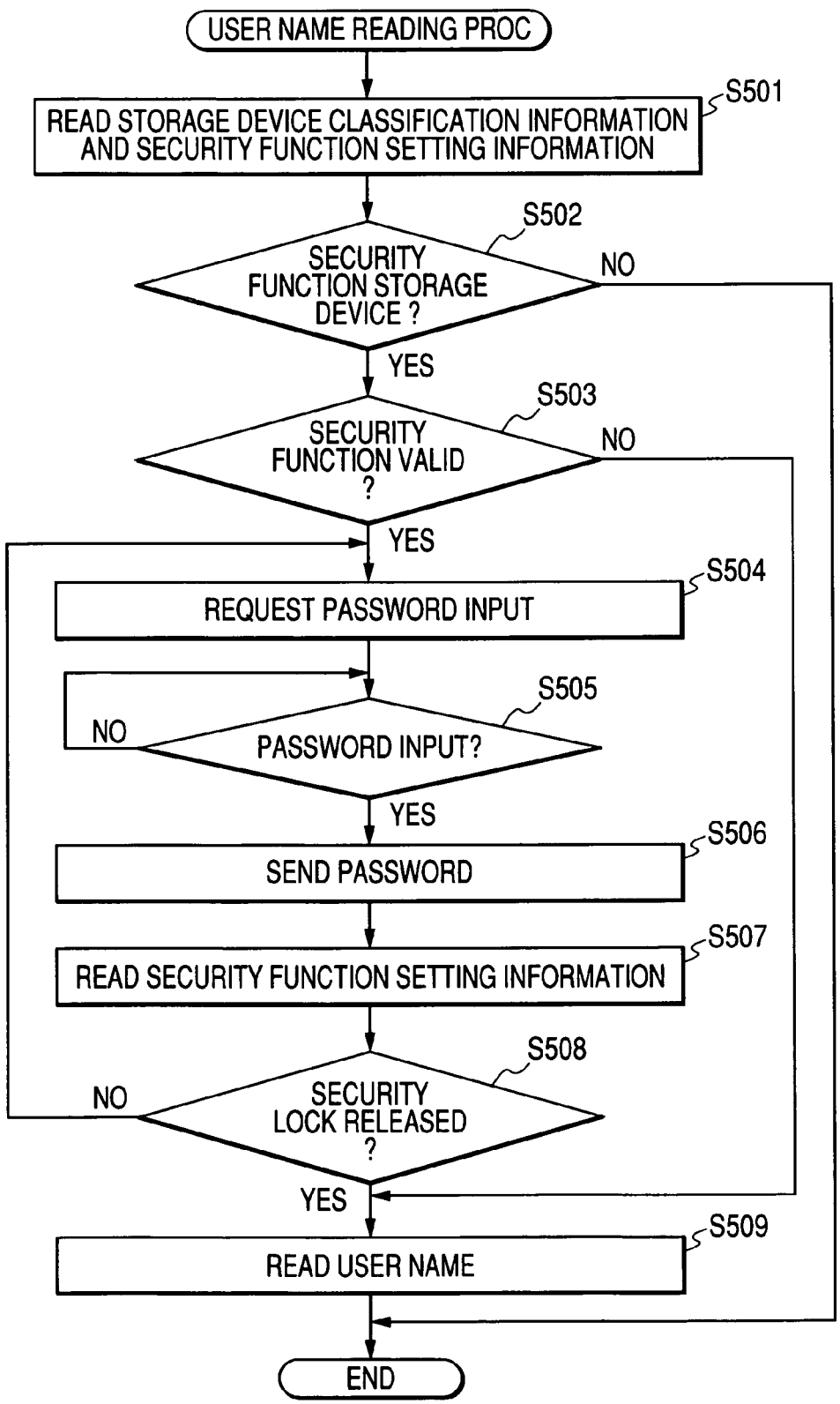
FIG. 5 is a flow chart of a user name reading process to be executed by a main body device 100 of the information processing apparatus in FIG. 1.

FIG. 5 is a flow chart of a user name reading process to be executed by the main body device 100 shown in FIG. 1.

It should be noted the user name reading process is executed when the storage devices 130 to 160 are recognized by the main body device 100, that is, when the power supply of the main body device 100 is turned on or connected to the storage devices 130 to 160.

In FIG. 5, when the storage devices 130 to 160 are recognized by the main body device 100, the storage device classification information 301 and the security function setting information 302 are read from the disk management area 300 of each of the storage devices 130 to 160 to the RAM 103 (step S501).

Subsequently, the following process is executed for each of the storage devices 130 to 160 with reference to the information read to the RAM 103.

In the first instance, it is judged whether or not the storage device is the security-function storage device (step S502). When judged that the storage device is the security-function storage device, it is further judged whether or not the security function has been set to be valid (step S503). When judged that the security function has been set to be valid, a display signal for requesting a user to input a password is output to the output device 120 (step S504). Then, when the password is input through the input device 110 (YES in step 505), the input password is transferred to the storage device (step S506), the security function setting information 302 is read from the disk management area 300 of the storage device (step S507), and it is then judged based on the security function setting information 302 whether or not the security lock is released (step S508). When judged that the security lock is not released, the steps S504 to S508 are repeated. Meanwhile, when judged that the security lock is released, a user name is read from the user information area 310 to the RAM 103 (step S509), and the user name reading process ends.

In the meantime, when judged in the step S503 that the security function is not set to be valid, the user name is read from the user information area 310 to the RAM 103 (step S509), and the user name reading process ends.

In the meantime, when judged in the step S502 that the storage device is not the security-function storage device, the user name reading process immediately ends.

The user name reading process can be achieved also by using an ATA/ATAPI standard scheme. In this case, for example, the main body device 100 issues an IDENTIFY DEVICE command to the storage device. Then, an IDENTIFY DEVICE information Word 129-159 Vender specific and a Word 128 Security status which are output by the storage device which received the IDENTIFY DEVICE command can be used respectively as the storage device classification information 301 and the security function setting information 302. Here, it is assumed that the security-function storage device outputs a predetermined code for discriminating the security-function storage device to the IDENTIFY DEVICE information Word 129-159 Vender specific. Incidentally, whether or not the storage device is the security-function storage device can be discriminated according to the judgment as to whether or not the Word 129-159 Vender specific indicates the security-function storage device. Further, whether or not the security function is set to be valid can be discriminated according to the judgment as to whether or not the bit 1 of the Word 128 Security status indicates Security enabled. Here, when a password is input to the storage device, a SECURITY UNLOCK command can be utilized. Furthermore, whether or not the security lock is released can be discriminated according to the judgment as to whether or not the bit 2 of the Word 128 Security status indicates Security unlocked.

According to the user name reading process shown in FIG. 5, in the case where the security lock is released (YES in step S508), the user name is read from the user information area 310 to the RAM 103 (step S509). Thus, it is possible to read the user name only in a case where the correct password is input and the security lock is thus released.

Figure 6:
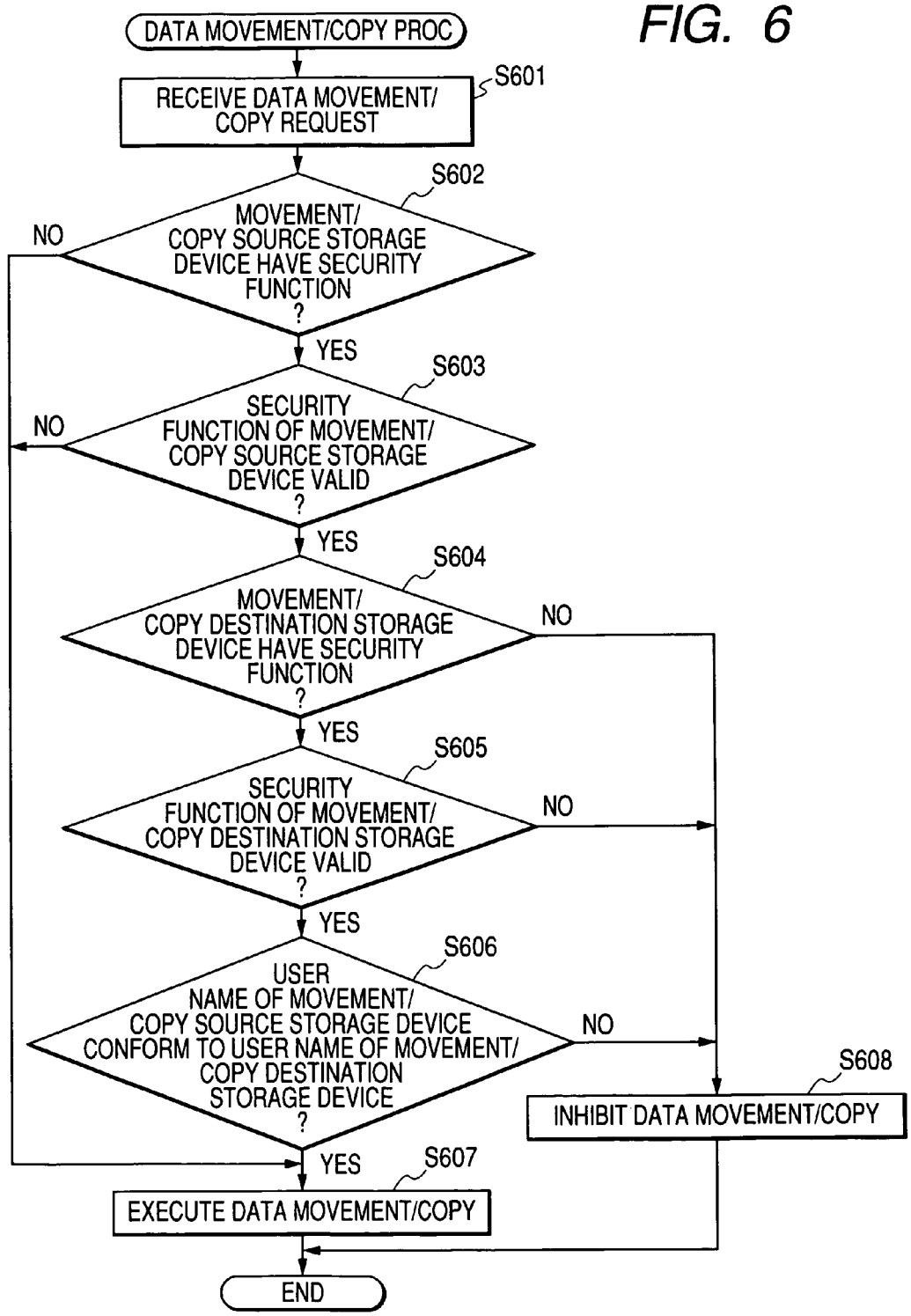
FIG. 6 is a flow chart of a data movement/copy process to be executed by the information processing apparatus of FIG. 1.

FIG. 6 is a flow chart of a data movement/copy process to be executed by the information processing apparatus shown in FIG. 1.

In FIG. 6, a data movement/copy request input by the user through the input device 110 is first received by the main body device 100 (step S601). Then, with reference to the storage device classification information 301 read in the step S501 of FIG. 5 from the disk management area 300 to the RAM 103 at the time of the recognition of the storage devices 130 to 160, it is judged whether or not the data movement/copy source storage device is the security-function storage device (step S602). Here, it should be noted that the data movement/copy source storage device is the storage device from which data movement/copy is executed. Then, when judged that the data movement/copy source storage device is not the security-function storage device, the data movement/copy is executed (step S607), and the data movement/copy process ends.

Meanwhile, when judged in the step S602 that the data movement/copy source storage device is the security-function storage device, it is further judged with reference to the security function setting information 302 read in the step S501 of FIG. 5 whether or not the security function of the data movement/copy source storage device has been set to be valid (step S603). When judged that the security function of the data movement/copy source storage device is not set to be valid, the data movement/copy is executed (step S607), and the data movement/copy process ends.

Figure 7A:
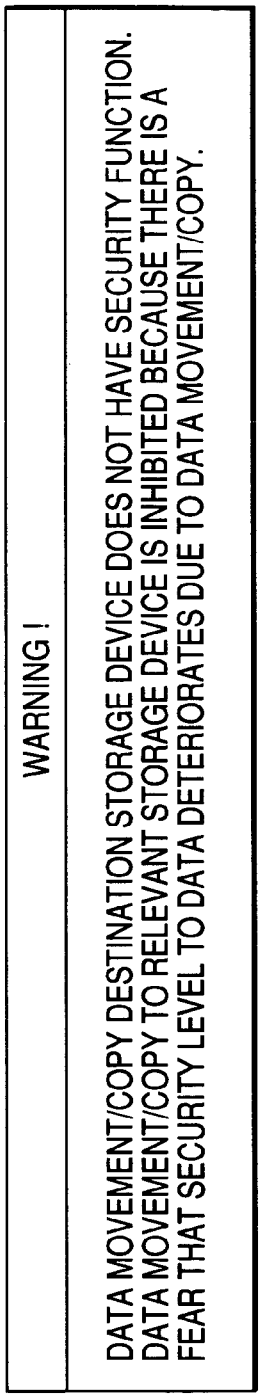
FIG. 7A is a diagram showing an example of an information screen to be displayed in a step S608 of FIG. 6 in a case where the storage device to which data is moved and/or copied is not a storage device having a security function.

When judged in the step S603 that the security function of the data movement/copy source storage device has been set to be valid, it is further judged with reference to the storage device classification information 301 read in the step S501 of FIG. 5 whether or not the data movement/copy destination storage device is the security-function storage device (step S604) (i.e., a security information comparison means or unit). Here, it should be noted that the data movement/copy destination storage device is the storage device to which data movement/copy is executed. Then, when judged that the data movement/copy destination storage device is not the security-function storage device, an information screen as shown in FIG. 7A is displayed on the output device 120 (i.e., a display means or unit) to inhibit the data movement/copy (step S608) (i.e., a data movement control means or unit). Then, the data movement/copy process ends.

Incidentally, the information screen shown in FIG. 7A is to inform the user that, since the data movement/copy is the movement/copy from the security-function storage device to the storage device which does not have a security function, the data movement/copy to the relevant storage device is inhibited so as to maintain a data security level.

Figure 7B:
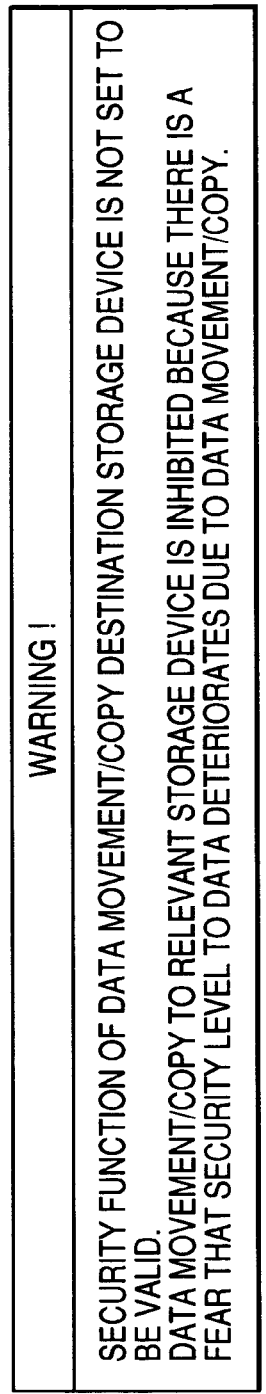
FIG. 7B is a diagram showing an example of the information screen to be displayed in the step S608 of FIG. 6 in a case where the security function of the storage device to which data is moved and/or copied is not effectively set.

In the meantime, when judged in the step S604 that the data movement/copy destination storage device is the security-function storage device, it is further judged with reference to the security function setting information 302 read in the step S501 of FIG. 5 whether or not the security function of the data movement/copy destination storage device has been set to be valid (step S605). When judged that the security function of the data movement/copy destination storage device is not set to be valid, an information screen as shown in FIG. 7B is displayed on the output device 120 to inhibit the data movement/copy (step S608). Then, the data movement/copy process ends.

Incidentally, the information screen shown in FIG. 7B is to inform the user that, since the data movement/copy is the movement/copy from the security-function storage device to the storage device of which the security function is not set to be valid, the data movement/copy to the relevant storage device is inhibited so as to maintain a data security level.

Figure 7C:
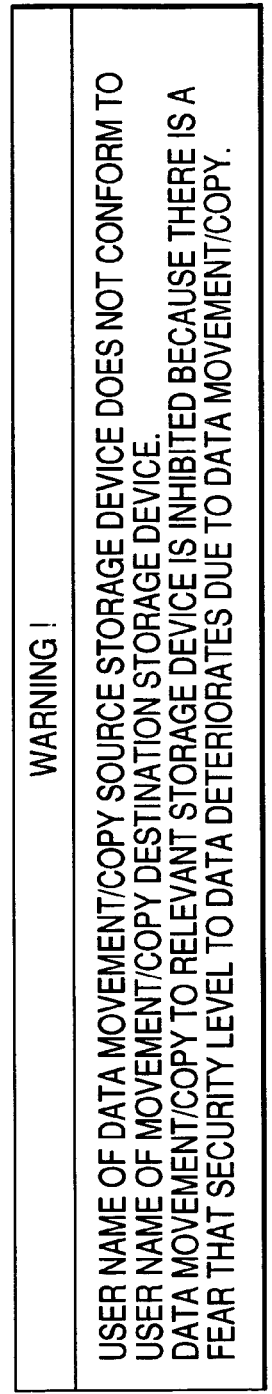
FIG. 7C is a diagram showing an example of the information screen to be displayed in the step S608 of FIG. 6 in a case where the user name of the storage device from which data is moved and/or copied does not conform to the user name of the storage device to which the data is moved and/or copied.

In the meantime, when judged in the step S605 that the security function of the data movement/copy destination storage device has been set to be valid, it is further judged with reference to the user name information read in the step S501 of FIG. 5 whether or not the user name of the data movement/copy source storage device conforms to the user name of the data movement/copy destination storage device (step S606). When judged that the user name of the data movement/copy source storage device does not conform to the user name of the data movement/copy destination storage device, an information screen as shown in FIG. 7C is displayed on the output device 120 to inhibit the data movement/copy (step S608). Then, the data movement/copy process ends.

Incidentally, the information screen shown in FIG. 7C is to inform the user that, since the user name of the data movement/copy source storage device is different from the user name of the data movement/copy destination storage device, the data movement/copy to the relevant storage device is not permitted.

In the meantime, when judged in the step S606 that the user name of the data movement/copy source storage device conforms to the user name of the data movement/copy destination storage device, the data movement/copy is executed (step S607), and the data movement/copy process ends. Here, it is allowed to judge that the conformation of the user name is given only when all of the plural user names of the data movement/copy source storage devices conform to the user name of the data movement/copy destination storage device. Alternatively, it is allowed to judge that the conformation of the user name is given even when a part of the plural user names of the data movement/copy source storage devices conforms to the user name of the data movement/copy destination storage device.

In the data movement/copy process, however, when the data movement/copy destination storage device is the security-function storage device and the security function thereof is set to be valid, the data movement/copy destination storage device executes the access control according to the status of the data area access control setting flag 308. That is, when the value of the data area access control setting flag 308 indicates that the data writing is disapproved (that is, only the data reading is approved), the reading command is received, but the writing command is abandoned. Meanwhile, when the value of the data area access control setting flag 308 indicates that the data writing is approved, both the reading command and the writing command are received. For this reason, in the case where the value of the data area access control setting flag 308 of the movement/copy destination storage device indicates that the data writing is disapproved (that is, only the data reading is approved), the writing command to the movement/copy destination storage device issued when the main body device 100 executes the data movement/copy process is abandoned, whereby it is resultingly impossible to execute the movement/copy of the data.

According to the data movement/copy process, in the case where the data movement/copy destination storage device is not the security-function storage device (NO in step S604), in the case where the security function of the data movement/copy destination storage device is not set to be valid (NO in step S605), or in the case where the user name of the data movement/copy source storage device does not conform to the user name of the data movement/copy destination storage device (NO in step S606), the information screen is displayed on the output device 120 and the data movement/copy is inhibited (step S608), whereby it is possible to secure strong safety with respect to the data movement/copy operation by the user between the storage devices.

Figure 8:
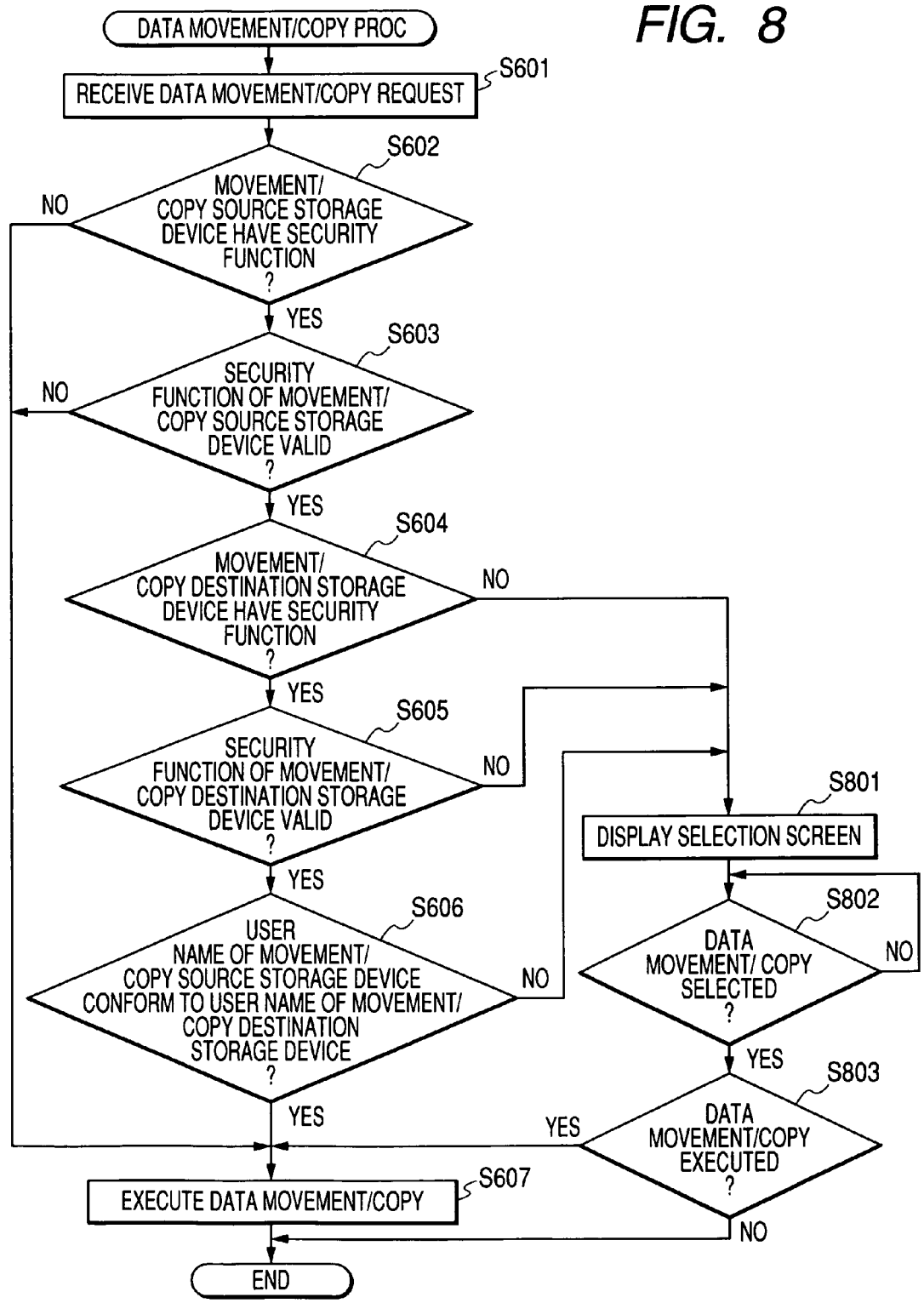
FIG. 8 is a flow chart of a modified example of the data movement/copy process in FIG. 6.

FIG. 8 is a flow chart of a modified example of the data movement/copy process shown in FIG. 6.

Here, it should be noted that the process shown in FIG. 8 is basically the same as the process shown in FIG. 6. In this connection, in FIG. 8, the steps same as those in FIG. 6 are denoted by the same symbols in FIG. 6 respectively, and the explanation of these steps will be omitted, whereby the part different from the process shown in FIG. 6 will be explained hereinafter. More specifically, the process of FIG. 8 is different from the process of FIG. 6 only in the respect that steps S801, S802 and S803 are provided instead of the step S608.

When judged in the step S604 that the data movement/copy destination storage device is not the security-function storage device, a selection screen as shown in FIG. 9A is displayed on the output device 120 (step S801) (i.e., an indication request means or unit).

Incidentally, the selection screen shown in FIG. 9A is to inform the user that the data movement/copy is the movement/copy from the security-function storage device to the storage device which does not have a security function. Furthermore, the selection screen shown in FIG. 9A issues a warning against deterioration of data security level, and causes the user to select whether or not to execute the data movement/copy through the input device 110.

Referring back to FIG. 8, when the user selects whether or not to execute the data movement/copy through the input device 110 (YES in step S802) (i.e., an acquisition means or unit), it is judged whether or not to execute the data movement/copy is selected (step S803). When judged that to execute the data movement/copy is selected, the data movement/copy is executed (step S607), and the data movement/copy process ends. Meanwhile, when judged that to-execute the data movement/copy is not selected (that is, not to execute the data movement/copy is selected), the data movement/copy process immediately ends.

In the meantime, when judged in the step S605 that the security function of the data movement/copy destination storage device is not set to be valid, a selection screen as shown in FIG. 9B is displayed on the output device 120 (step S801), the flow advances to the steps S802 and S803, and then the data movement/copy process ends.

Incidentally, the selection screen shown in FIG. 9B is to inform the user that the data movement/copy is the movement/copy from the security-function storage device to the storage device of which the security function is not set to be valid. Furthermore, the selection screen shown in FIG. 9B issues a warning against deterioration of data security level, and causes the user to select whether or not to execute the data movement/copy through the input device 110.

In the meantime, when judged in the step S606 that the user name of the data movement/copy source storage device does not conform to the user name of the data movement/copy destination storage device, a selection screen as shown in FIG. 9C is displayed on the output device 120 (step S801), the flow advances to the steps S802 and S803, and then the data movement/copy process ends.

Incidentally, the selection screen shown in FIG. 9C issues a warning against the fact that the user name of the data movement/copy source storage device is different from the user name of the data movement/copy destination storage device, and causes the user to select whether or not to execute the data movement/copy through the input device 110.

According to the data movement/copy process shown in FIG. 8, in the case where the data movement/copy destination storage device is not the security-function storage device (NO in step S604), in the case where the security function of the data movement/copy destination storage device is not set to be valid (NO in step S605), or in the case where the user name of the data movement/copy source storage device does not conform to the user name of the data movement/copy destination storage device (NO in step S606), the selection screen is displayed on the output device 120 (step S801). Then, in the case where it is selected to execute the data movement/copy (YES in step S803), the data movement/copy is executed (step S607). Accordingly, it is possible to secure strong safety with respect to the data movement/copy operation by the user between the storage devices, and it is also possible to execute the data movement/copy operation in which user's intention is flexibly reflected.

Here, it is needless to say that the object of the present invention can be attained even in a case where a storage medium (or a recording medium) which stores therein program codes of software to realize the functions of the above embodiments is supplied to a system or an apparatus, and thus a computer (or CPU or MPU) in the system or the apparatus reads and executes the program codes stored in the storage medium.

In this case, the program codes themselves read out of the storage medium realize the functions of the above embodiments, whereby the storage medium which stores the relevant program codes constitutes the present invention.

Moreover, it is needless to say that the present invention includes not only a case where the functions of the above embodiments are realized by executing the program codes read by the computer, but also a case where an OS (operating system) or the like running on the computer performs a part or all of the actual processes on the basis of the indications of the program codes and thus the functions of the above embodiments are realized by such the processes.

Furthermore, it is needless to say that the present invention also includes a case where, after the program codes read out of the storage medium are written into a function expansion card inserted in the computer or a memory in a function expansion unit connected to the computer, a CPU or the like provided in the function expansion card or the function expansion unit performs a part or all of the actual processes on the basis of the indications of the program codes, and thus the functions of the above embodiments are realized by such the processes.

Furthermore, the program code may be a program which is used to cause a computer to be able to realize the functions of the above embodiments. Therefore, because the form of program is no object if it has an actual function as the program, an object code, a program executed by an interpreter, script data supplied to an OS, and the like may be included as the program.

As the storage medium for supplying the program, for example, a RAM, an NV-RAM, a floppy™ disk, an optical disk, a magnetooptical disk, a CR-ROM, an MO, a CD-R, a CD-RW, DVD's (DVD-ROM, DVD-RAM, DVD-RW, DVD+R), a magnetic tape, a nonvolatile memory card, a ROM, or the like can be used. Alternatively, the program can be supplied by downloading it from not-shown another computer, a database or the like connected to the Internet, a commercial network, a local area network or the like.

In other words, the foregoing description of the embodiments has been given for illustrative purposes only and not to be construed as imposing any limitation in every respect.

The scope of the invention is, therefore, to be determined solely by the following claims and not limited by the text of the specifications and alternations made within a scope equivalent to the scope of the claims fall within the true spirit and scope of the invention.

This application claims priority from Japanese Patent Application No. 2004-088100 filed Mar. 24, 2004, which is hereby incorporated by reference herein.

What is claimed is:

1. An information processing apparatus which is equipped with plural storage devices each storing security function information indicating at least a security level of the respective storage device, said apparatus comprising:
   a data move request receiving unit adapted to receive a request to move data from a source storage device to a destination storage device among the plural storage devices;
   a security function information comparison unit adapted to, upon the data move request unit receiving the data move request, compare the security level of the source storage device with the security level of the destination storage device, based on the security function information;
   a data move control unit adapted to inhibit the data move if the security level of the source storage device is higher than the security level of the destination storage device and allow the data move, wherein the data move control unit copies the data from the source storage device to the destination storage device and erases the data copied to the destination storage device from the source storage device, if the security level of the source storage device matches that of the destination storage device,
   wherein the security function information includes user authentication information and data area access right information, and
   wherein when the user authentication information included in the security function information stored in the source storage device indicates that a user authentication function exists but the user authentication information included in the security function information stored in the destination storage device does not indicate that the user authentication function exists, said security function information comparison unit judges that the security function information stored in the source storage device does not conform to the security function information stored in the destination storage device.

2. An information processing apparatus according to claim 1, wherein, when the security function information stored in said source storage device does not conform to the security function information stored in said destination storage device, said data move control unit does not permit the data move.

3. An information processing apparatus according to claim 1, wherein said data move control unit further comprises:
   an indication request unit adapted to request an indication whether or not to execute the data move when the security function information stored in said source storage device does not conform to the security function information stored in said destination storage device; and
   an acquisition unit adapted to acquire the indication,
   wherein when said acquisition unit acquires the indication to execute the data move, said data move control unit permits the data move.

4. An information processing apparatus according to claim 1, wherein when the user authentication information included in the security function information stored in said source storage device indicates that a user authentication function has been set to be valid but the user authentication information included in the security function information stored in said destination storage device indicates that the user authentication function is not set to be valid, said security function information comparison unit judges that the security function information stored in said source storage device does not conform to the security function information stored in said destination storage device.

5. An information processing apparatus according to claim 1, wherein:
   the user authentication information included in the security function information includes user discrimination information, and
   when the user discrimination information included in the security function information stored in said source storage device does not conform to the user discrimination information included in the security function information stored in said destination storage device, said security function information comparison unit judges that the security function information stored in said source storage device does not conform to the security function information stored in said destination storage device.

6. An information processing apparatus according to claim 1, further comprising a display unit adapted to display the comparison result acquired by said security function information comparison unit.

7. A control method for an information processing apparatus which is equipped with plural storage devices each storing security function information indicating at least a security level of the respective storage device, said method comprising:
   a data move request receiving step of receiving a request to move data from a source storage device to a destination storage device among the plural storage devices;
   a security function information comparison step of, upon the data move request receiving step receiving the data move request, comparing the security level of the source storage device with the security level of the destination storage device, based on the security function information;

a data move control step of inhibiting the data move if the security level of the source storage device is higher than the security level of the destination storage device and allowing the data move, wherein the data move control step copies the data from the source storage device to the destination storage device and erases the data copied to the destination storage device from the source storage device, if the security level of the source storage device matches that of the destination storage device, wherein the security function information includes user authentication information and data area access right information, and wherein when the user authentication information included in the security function information stored in the source storage device indicates that a user authentication function exists but the user authentication information included in the security function information stored in the destination storage device does not indicate that the user authentication function exists, said security function information comparison step judges that the security function information stored in the source storage device does not conform to the security function information stored in the destination storage device.

8. A control method according to claim 7, wherein, when the security function information stored in the source storage device does not conform to the security function information stored in the destination storage device, said data move control step does not permit the data move.

9. A control method according to claim 7, wherein said data move control step further comprises:

an indication request step of requesting an indication whether or not to execute the data move when the security function information stored in the source storage device does not conform to the security function information stored in the destination storage device; and an acquisition step of acquiring the indication, when said acquisition step acquires the indication to execute the data move, said data move control step permits the the data move.

10. A control method according to claim 7, wherein when the user authentication information included in the security function information stored in the source storage device indicates that a user authentication function has been set to be valid but the user authentication information included in the security function information stored in the destination storage device indicates that the user authentication function is not set to be valid, said security function information comparison step judges that the security function information stored in the source storage device does not conform to the security function information stored in the destination storage device.

11. A control method according to claim 7, wherein:

the user authentication information included in the security function information includes user discrimination information, and when the user discrimination information included in the security function information stored in the source storage device does not conform to the user discrimination information included in the security function information stored in the destination storage device, said security function information comparison step judges that the security function information stored in the source storage device does not conform to the security function information stored in the destination storage device.

12. A control method according to claim 7, further comprising a display step of displaying the comparison result acquired in said security function information comparison step.

13. A non-transitory computer-readable storage medium storing a computer program for an information processing apparatus which is equipped with plural storage devices each storing security function information indicating at least a security level of the respective storage device, said program comprising:

a data move request receiving module for receiving a request to move data from a source storage device to a destination storage device among the plural storage devices;

a security function information comparison module for, upon the data move request receiving module receiving the data move request, comparing the security level of the source storage device with the security level of the destination storage device, based on the security function information;

a data move control module for inhibiting the data move if the security level of the source storage device is higher than the security level of the destination storage device and allowing the data move, wherein the data move control module copies the data from the source storage device to the destination storage device and erases the data copied to the destination storage device from the source storage device, if the security level of the source storage device matches that of the destination storage device, wherein the security function information includes user authentication information and data area access right information, and wherein when the user authentication information included in the security function information stored in the source storage device indicates that a user authentication function exists but the user authentication information included in the security function information stored in the destination storage device does not indicate that the user authentication function exists, said security function information comparison module judges that the security function information stored in the source storage device does not conform to the security function information stored in the destination storage device.

14. An information processing apparatus which is equipped with plural storage devices each storing security function information indicating at least a security level of the respective storage device, said apparatus comprising:

a data move request receiving unit adapted to receive a request to move data from a source storage device to a destination storage device among the plural storage devices;

a security function information comparison unit adapted to, upon the data move request unit receiving the data move request, compare the security level of the source storage device with the security level of the destination storage device, based on the security function information;

a display unit adapted to display a warning if the security level of the source storage device is higher than the security level of the destination storage device and not display a warning if the security level of the source storage device matches that of the destination storage device;

a receiving unit adapted to receive an instruction whether or not to allow the data move if the warning is displayed; and a data move control unit adapted to allow the data move, wherein the data move control unit copies the data from the source storage device to the destination storage device and erases the data copied to the destination storage device from the source storage device, if the receiving unit receives instruction to allow the data move and inhibit the data move if the receiving unit receives instruction to not allow the data move, when the warning is displayed, wherein the security function information includes user authentication information and data area access right information, and wherein when the user authentication information included in the security function information stored in the source storage device indicates that a user authentication function exists but the user authentication information included in the security function information stored in the destination storage device does not indicate that the user authentication function exists, said security function information comparison unit judges that the security function information stored in the source storage device does not conform to the security function information stored in the destination storage device.

* * * * *